(12) United States Patent
Vestberg

(10) Patent No.: US 11,078,310 B2
(45) Date of Patent: *Aug. 3, 2021

(54) CATALYST COMPONENT FOR THE PREPARATION OF NUCLEATED POLYOLEFINS

(71) Applicant: BOREALIS AG, Vienna (AT)

(72) Inventor: Torvald Vestberg, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,654

(22) Filed: Sep. 18, 2018

(65) Prior Publication Data

US 2019/0016834 A1 Jan. 17, 2019

Related U.S. Application Data

(63) Continuation of application No. 15/318,344, filed as application No. PCT/EP2015/062782 on Jun. 9, 2015, now Pat. No. 10,138,308.

(30) Foreign Application Priority Data

Jun. 27, 2014 (EP) .................................... 14174692

(51) Int. Cl.
*C08F 110/06* (2006.01)

(52) U.S. Cl.
CPC .................................... *C08F 110/06* (2013.01)

(58) Field of Classification Search
CPC ..... C08F 110/06; C08F 4/6548; C08F 4/6492
See application file for complete search history.

(56) References Cited

U.S. PATENT DOCUMENTS

| 4,294,948 A | 10/1981 | Toyota et al. |
| 5,409,875 A | 4/1995 | Hsu et al. |
| 5,413,979 A | 5/1995 | Kostiainen et al. |
| 6,437,063 B1 | 8/2002 | Karbasi et al. |
| 8,389,654 B2 | 3/2013 | Alastalo et al. |
| 10,138,308 B2 * | 11/2018 | Vestberg ............... C08F 110/06 |

FOREIGN PATENT DOCUMENTS

| CN | 101175776 A | 5/2008 | |
| EP | 0083073 A1 | 7/1983 | |
| EP | 0083074 A1 | 7/1983 | |
| EP | 0586390 B1 | 3/1994 | |
| EP | 0591224 B1 | 4/1994 | |
| EP | 0713886 A2 | 5/1996 | |
| EP | 491566 B1 | 10/1996 | |
| EP | 0926165 A1 | 6/1999 | |
| EP | 0949280 A1 | 10/1999 | |
| EP | 0856013 B1 | 7/2000 | |
| EP | 1183307 B1 | 3/2002 | |
| EP | 1273595 A | 1/2003 | |
| EP | 1028985 B1 * | 4/2003 | ............. C08F 10/06 |
| EP | 2415790 A1 | 2/2012 | |
| EP | 2610270 A1 | 7/2013 | |
| EP | 2610271 A1 | 7/2013 | |
| EP | 2610272 A1 | 7/2013 | |
| WO | 99/24478 A1 | 5/1999 | |
| WO | 99/24479 A1 | 5/1999 | |
| WO | 00/08073 A1 | 2/2000 | |
| WO | 00/08074 A1 | 2/2000 | |
| WO | 00/68315 A1 | 11/2000 | |
| WO | 01/55230 A1 | 8/2001 | |
| WO | 2012/007430 A1 | 1/2012 | |

OTHER PUBLICATIONS

Office action for Chinese Patent Application No. 201580031465.6, dated May 3, 2018.
Kiyoshi Endo et al: "Polymerization of Vinylcyclohexane With Ziegler-Nati A Catalyst", Journal of Polymer Science, Polymer Chemistry Edition, Interscience Publishers, New York, NY, US, vol. 30, No. 4, Mar. 30, 1992 (Mar. 30, 1992), pp. 679-683.
Zhe Zhou, et al., "A new decoupling method for accurate quantification of polyethylene copolymer composition and triad sequence distribution with 13C NMR", (2007) pp. 225-231.
Luigi Resconi, et al., "Selectivity in Propene Polymerization with Metallocene Catalysts", 2000, pp. 1253-1345.
H. N. Cheng, "13C NMR Analysis of Ethylene-Propylene Rubbers", Hercules Incorporated, Research Center, 1984, pp. 1950-1955.
Vincenzo Busico, et al., "Microstructure of polypropylene", Prog. Polym. Sci., (2001), pp. 443-533.
Vincenzo Busico, et al., "Alk-1-ene Polymerization in the Presence of a Monocyclopentadienyl Zirconium(IV) Acetamidinate Catalyst: Microstructural and Mechanistic Insightsa", (2007), pp. 1128-1134.
Nen-Jun Wang, et al., "Structural Analysis of Ethylene/Propylene Copolymers Synthesized with a Constrained Geometry Catalyst", Department of Chemical Engineering, McMaster University, (2000), pp. 1157-1162.
Vincenzo Busico, et al., "Full Assignment of the 13C NMR Spectra of Regioregular Polypropylenes: Methyl and Methylene Region", (1997), pp. 6251-6263.

* cited by examiner

*Primary Examiner* — Catherine S Branch
(74) *Attorney, Agent, or Firm* — Tarolli, Sundheim, Covell & Tummino LLP

(57) ABSTRACT

Catalyst composition comprising a phthalate-free electron donor, which is highly effective during polymerisation in the presence of a polymeric nucleating agent, and its use and a process for its preparation.

5 Claims, No Drawings

CATALYST COMPONENT FOR THE PREPARATION OF NUCLEATED POLYOLEFINS

The invention relates to a phthalate-free catalyst composition, particularly one comprising a Group 2 metal.

The invention also relates to the use of such a catalyst composition which can be further used in the polymerisation of alpha-olefins, like e.g. polyethylene and polypropylene, comprising nucleating agents.

It further relates to a process for preparing a nucleated polypropylene based on above said phthalate-free catalyst composition.

BACKGROUND OF THE INVENTION

Ziegler-Natta (ZN) type polyolefin catalysts are well known in the field of polymers, generally, they comprise (a) at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), and, optionally, a compound of group 13 of the Periodic Table (IUPAC) and/or an internal donor compound. ZN catalyst may also comprise (b) further catalyst component(s), such as a cocatalyst and/or an external donor.

Various methods for preparing ZN catalysts are known in the state of art. In one known method, a supported ZN catalyst system is prepared by impregnating the catalyst components on a particulate support material. In WO-A-01 55 230, the catalyst component(s) are supported on a porous, inorganic or organic particulate carrier material, such as silica.

In a further well known method the carrier material is based on one of the catalyst components, e.g. on a magnesium compound, such as $MgCl_2$. This type of carrier material can also be formed in various ways. EP-A-713 886 of Japan Olefins describes the formation of $MgCl_2$ adduct with an alcohol which is then emulsified and finally the resultant mixture is quenched to cause the solidification of the droplets. Alternatively, EP-A-856 013 of BP discloses the formation of a solid Mg-based carrier, wherein the Mg-component containing phase is dispersed to a continuous phase and the dispersed Mg-phase is solidified by adding the two-phase mixture to a liquid hydrocarbon. The formed solid carrier particles are normally treated with a transition metal compound and optionally with other compounds for forming the active catalyst.

Accordingly, in case of external carriers, some examples of which are disclosed above, the morphology of the carrier is one of the defining factors for the morphology of the final catalyst.

WO-A-00 08073 and WO-A-00 08074 describe further methods for producing a solid ZN-catalyst, wherein a solution of an Mg-based compound and one or more further catalyst compounds are formed and the reaction product thereof is precipitated out of the solution by heating the system. Furthermore, EP-A-926 165 discloses another precipitating method, wherein a mixture of $MgCl_2$ and Mg-alkoxide is precipitated together with a Ti-compound to give a ZN catalyst.

EP-A-83 074 and EP-A-83 073 of Montedison disclose methods for producing a ZN catalyst or a precursor thereof, wherein an emulsion or dispersion of Mg and/or Ti compound is formed in an inert liquid medium or inert gas phase and said system is reacted with an Al-alkyl compound to precipitate a solid catalyst. According to examples said emulsion is then added to a larger volume of Al-compound in hexane and prepolymerised to cause the precipitation.

In polymerisation process this causes in turn undesired and harmful disturbances, like plugging, formation of polymer layer on the walls of the reactor and in lines and in further equipments, like extruders, as well decreased flowability of polymer powder and other polymer handling problems.

EP 1403292 A1, EP 0949280 A1, U.S. Pat. Nos. 4,294, 948, 5,413,979 and 5,409,875 as well as EP 1273595 A1 describe processes for the preparation of olefin polymerisation catalyst components or olefin polymerisation catalysts as well as processes for preparing olefin polymers or copolymers.

Accordingly, although much development work has been done in the field of Ziegler-Natta catalysts, there remains a need for alternative or improved methods of producing ZN catalysts with desirable properties. One particular aspect in this connection is the desire to avoid as far as possible the use of substances which are considered as potential harmful compounds regarding health as well as environmental aspects. One class of substances which have been considered as potential harmful compounds is phthalates, which have been commonly used as internal electron donors in Ziegler-Natta type catalysts.

Although the amount of these phthalate compounds, used as internal donors in catalysts, in the final polymer is very small, it is still desirable to find out alternative compounds to replace phthalate compounds and still get catalysts having good activity, excellent morphology and other desired properties.

WO-1999024478-A1 discloses a polymerisation method to incorporate polymeric nucleating agents into the polymer to modify the mechanical properties.

This process is based on Ziegler-Natta catalysts as mentioned above, which comprise an internal donor based on phthalate-compositions.

However, some of such phthalate-compositions are under suspicion of generating negative HSE effects Furthermore, there is an increasing demand on the market for "phthalate-free polypropylene" suitable for various applications, e.g. in the field of packaging and medical applications as well as personal care, or personal hygiene.

WO2012007430 also incorporated herein by reference, is one example of a limited number of patent applications, describing phthalate free catalysts based on citraconate as internal donor.

However, up to now the mechanical properties of polypropylenes produced with catalysts having citraconate compositions as internal donors did not fulfill all the desired requirements, especially in view of stiffness/impact-balance. Up to now significantly higher amount of internal donor is to be used in the phthalate-free catalyst preparation to achieve the desired polymer properties Although the inventors of WO2012007430 considered adding donor dissolved in organic solvent and TiCl4 to form washing solution, the reactivity of such catalyst is not satisfying in respect to activity (being low), or xylene solubles (being high).

Object of the Invention

So the present invention concerns a catalyst composition, which is especially suitable for the production of nucleated polypropylene compositions.

In a special embodiment the present invention deals also with the use of above mentioned catalyst composition in polymerisation processes, suitable for the production of nucleated polypropylene comprising a polymeric nucleating agent.

In a further embodiment the present invention is related a process for the production of nucleated polypropylene in the presence of a polymeric nucleating agent and a phthalate free catalyst component.

A catalyst having high nucleating effect in polypropylene, is of outmost importance when polyolefins, especially polypropylenes with improved stiffness-impact behaviour are desired, as a good nucleation has decisive effect on the performance of the final product.

Surprisingly the inventors have now identified a catalyst composition which solves the above identified problems.

Thus the present invention provides a catalyst composition containing a catalyst component obtained by a process comprising the steps of a1) providing a solution of at least a Group 2 metal alkoxy compound (Ax) being the reaction product of a Group 2 metal compound (MC) and a monohydric alcohol (A) comprising in addition to the hydroxyl moiety at least one ether moiety optionally in an organic liquid reaction medium; or a2) a solution of at least a Group 2 metal alkoxy compound (Ax') being the reaction product of a Group 2 metal compound (MC) and an alcohol mixture of the monohydric alcohol (A) and a monohydric alcohol (B) of formula ROH, optionally in an organic liquid reaction medium; or a3) providing a solution of a mixture of the Group 2 metal alkoxy compound (Ax) and a Group 2 metal alkoxy compound (Bx) being the reaction product of a Group 2 metal compound (MC) and the monohydric alcohol (B), optionally in an organic liquid reaction medium; or a4) providing a solution of Group 2 metal alkoxy compound of formula $M(OR1)_n(OR2)_m X_{2-n-m}$ or mixture of Group 2 alkoxides $M(OR1)_{n'} X_{2-n'}$ and $M(OR2)_{m'} X_{2-m'}$, where M is Group 2 metal, X is halogen, R1 and R2 are different alkyl groups of C2 to C16 carbon atoms, and $0 \leq n < 2$, $0 \leq m < 2$ and $n+m+(2-n-m)=2$, provided that both n and $m \neq 0$, $0 < n' \leq 2$ and $0 < m' \leq 2$;

and b) adding said solution from step a) to at least one compound (TC) of a transition metal of Group 4 to 6 and c) obtaining the solid catalyst component particles, d) washing said solidified particles, e) recovering the solidified particles of the olefin polymerisation catalyst component, wherein an electron donor is added at any step prior to step c) and is a non-phthalic internal electron donor, and wherein the catalyst component is further modified by a polymeric nucleating agent comprising vinyl compound units.

The present invention is further related to the use of the above modified catalyst component together with a cocatalyst and optionally an external donor for the production of polyolefins, like e.g. polyethylene and polypropylene and their copolymers, especially of nucleated polypropylenes; as the catalyst of the present invention has a high nucleating efficiency and The present invention is also related to the process for producing nucleated polypropylene.

The catalyst composition produced according the current invention has also very high reactivity towards polymeric nucleating agents and shows higher conversion of polymeric nucleating agents, namely lower levels of unreacted VCH than prior art catalysts. This again has decisive effect on the performance of the final product.

The catalyst composition of the present inventions also fulfills both the expected future legal and HSE-requirements regarding phthalate free catalyst systems.

The advantages of the present polymerisation method can especially be seen in the increased crystallinity (i.e. increase of the Crystallisation temperature Tcr) of the produced polypropylene.

There is also an increase seen in the Melting Temperature (Tm) of the nucleated polypropylene produced with this catalyst composition.

The present polymerisation method provides nucleated polypropylene products comprising polymeric nucleating agents like vinyl compounds selected from the group of vinyl alkanes, vinyl cyclo alkanes, like vinyl cyclohexane, vinyl cyclopentane, vinyl-2-methyl cyclohexane and vinyl norbornane, 3methyl-1-butene, styrene, p-methyl-styrene, 3-ethyl-1-hexene and mixtures thereof, wherein vinyl alkanes or vinyl cycyloalkanes are espcecially preferred.

Said polypropylene products have increased crystallinity and hence improved stiffness/impact behaviour.

DETAILED DESCRIPTION OF THE INVENTION

Catalyst Description

The Ziegler-Natta catalyst (ZN-C) will be now described in more detail.

The catalyst used in the present invention is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, but the catalyst is selfsupported.

The Ziegler-Natta catalyst (ZN-C) can be further defined by the way as obtained.

Accordingly, the Ziegler-Natta catalyst (ZN-C) is preferably obtained by a process comprising the steps of a)

$a_1$) providing a solution of at least a Group 2 metal alkoxy compound (Ax) being the reaction product of a Group 2 metal compound (MC) and a monohydric alcohol (A) comprising in addition to the hydroxyl moiety at least one ether moiety optionally in an organic liquid reaction medium; or $a_2$) a solution of at least a Group 2 metal alkoxy compound (Ax') being the reaction product of a Group 2 metal compound (MC) and an alcohol mixture of the monohydric alcohol (A) and a monohydric alcohol (B) of formula ROH, optionally in an organic liquid reaction medium; or $a_3$) providing a solution of a mixture of the Group 2 metal alkoxy compound (Ax) and a Group 2 metal alkoxy compound (Bx) being the reaction product of a Group 2 metal compound (MC) and the monohydric alcohol (B), optionally in an organic liquid reaction medium; or $a_4$) providing a solution of Group 2 metal alkoxy compound of formula $M(OR_1)_n(OR_2)_m X_{2-n-m}$ or mixture of Group 2 alkoxides $M(OR_1)_n X_{2-n}$, and $M(OR_2)_m X_{2-m}$, where M is Group 2 metal, X is halogen, $R_1$ and $R_2$ are different alkyl groups of $C_2$ to $C_{16}$ carbon atoms, and $0 \leq n<2$, $0 \leq m<2$ and $n+m+(2-n-m)=2$, provided that both n and $m \neq 0$, $0<n' \leq 2$ and $0 \leq m' \leq 2$; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is thus added preferably to the solution of step a) or to the transition metal compound before adding the solution of step a).

According to the procedure above the Ziegler-Natta catalyst (ZN-C) can be obtained via precipitation method or via emulsion—solidification method depending on the physical conditions, especially temperature used in steps b) and c). Emulsion is also called in this application liquid/liquid two-phase system.

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion—solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion—solidification method is preferably used in the present invention.

In a preferred embodiment in step a) the solution of $a_2$) or $a_3$) are used, i.e. a solution of (Ax') or a solution of a mixture of (Ax) and (Bx), especially the solution of $a_2$).

Preferably the Group 2 metal (MC) is magnesium.

The magnesium alkoxy compounds as defined above can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_2$-$C_{16}$ alkyl residue, preferably $C_4$ to $C_{10}$, more preferably C6 to $C_8$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, most preferably 4.1 to 1:4.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R" $(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane.

Hexanes and pentanes are particular preferred.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with an aromatic and/or aliphatic hydrocarbons, preferably with toluene, heptane or pentane and or with $TiCl_4$. Washing solutions can also contain donors and/or compounds of Group 13, like trialkyl aluminium, halogenated alky aluminium compounds or alkoxy aluminium compounds.

Aluminium compounds can also be added during the catalyst synthesis. The catalyst can further be dried, as by evaporation or flushing with nitrogen or it can be slurried to an oily liquid without any drying step.

Preferably the catalyst component is washed at least three times with at least one toluene and at least one TiCl4 washing step and 1 to 3 further washing steps with an aromatic and/or aliphatic hydrocarbons selected from toluene, heptane or pentane.

In a further preferred embodiment donor is added to either a toluene wash step and/or to a TiCl4 wash step.

The amount of donor added to the washing steps is in the range of 10 to 60 wt % of the total amount of donor used in catalyst preparation steps a) to d).

In case there are more than one washing step where donor is added, the amount of donor in each of the according washing steps may be in the range of at least of 5-55 wt % of the total amount of donor used in catalyst preparation steps a) to d), wherein the amount of donor added to the washing steps is in the range of 10 to 60 wt % of the total amount of donor used in catalyst preparation steps a) to d).

The finally obtained Ziegler-Natta catalyst component is desirably in the form of particles having generally an average particle size range of 5 to 200 μm, preferably 10 to 100. Particles are compact with low porosity and have surface area below 20 $g/m^2$, more preferably below 10 $g/m^2$. Typically the amount of Ti is 1 to 6 wt-%, Mg 8 to 20 wt-% and donor 10 to 40 wt-% of the catalyst composition.

Detailed description of preparation of catalysts is disclosed in WO 2012/007430, EP2610271, EP 2610270 and EP2610272 which are incorporated here by reference.

The Ziegler-Natta catalyst (ZN-C) is preferably used in association with an alkyl aluminum cocatalyst and external donors.

Suitable external donors (ED) include certain silanes, ethers, esters, amines, ketones, heterocyclic compounds and blends of these. It is especially preferred to use a silane. It is most preferred to use silanes of the general formula

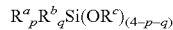

$R^a{}_p R^b{}_q Si(OR^c)_{(4-p-q)}$ wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula

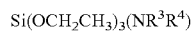

$Si(OCH_2CH_3)_3(NR^3R^4)$ wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the dicyclopentyl-dimethoxy silane donor (D-donor) or the cyclohexylmethyl dimethoxy silane donor (C-Donor).

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkyl-aluminium, like triethylaluminium (TEAL), dialkyl aluminium chloride or alkyl aluminium dichloride or mixtures thereof. In one specific embodiment the co-catalyst (Co) is triethylaluminium (TEAL).

Advantageously, the triethyl aluminium (TEAL) has a hydride content, expressed as $AlH_3$, of less than 1.0 wt % with respect to the triethyl aluminium (TEAL). More preferably, the hydride content is less than 0.5 wt %, and most preferably the hydride content is less than 0.1 wt %.

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25; and optionally
(b) the mol-ratio of co-catalyst (Co) to titanium compound (TC) [Co/TC] must be in the range of above 80 to 500, preferably is in the range of 100 to 350, still more preferably is in the range of 120 to 300.

According to the present invention the catalyst component is modified with a polymeric nucleating agent.

Any known polymeric nucleating agent may be employed including polymers of vinyl alkanes and vinyl cycloalkanes.

A preferred example of such a polymeric nucleating agent is a vinyl polymer, such as a vinyl polymer derived from monomers of the formula

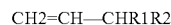

CH2=CH—CHR1R2 wherein R1 and R2, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched C4-C30 alkane, C4-C20 cycloalkane or C4-C20 aromatic ring. Preferably R1 and R2, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

The polymeric nucleating agent is incorporated in the catalyst component by the so called BNT-technology as mentioned below.

With regard to the BNT-technology reference is made to the international applications WO 99/24478, WO 99/24479 and particularly WO 00/68315. According to this technology the catalyst component is modified by polymerising a vinyl compound in the presence of the catalyst system, comprising in particular the special catalyst component, an external donor and a cocatalyst General conditions for the modification of the catalyst, like liquid media and process parameters are also disclosed in WO 99/24478, WO 99/24479 and particularly WO 00/68315, incorporated herein by reference with respect to the modification of the polymerisation catalyst.

The weight ratio of vinyl compound to polymerisation catalyst in the modification step of the polymerisation catalyst preferably is 0.3 or more up to 40, such as 0.4 to 20 or more preferably 0.5 to 15, like 0.5 to 2.0.

Suitable media for the modification step include, in addition to oils, also aliphatic inert organic solvents with low viscosity, such as pentane and heptane. Furthermore, small amounts of hydrogen can be used during the modification.

The polymeric nucleating agent usually is present in the final product in an amount of from more than 10 ppm, typically more than 15 ppm, (based on the weight of the polypropylene composition). Preferably this agent is present in the polypropylene composition in a range of from 10 to 1000 ppm, more preferably more than 15 to 500 ppm, such as 20 to 100 ppm.

The polymerisation of the catalyst with said vinyl compound is performed until the concentration of unreacted vinyl compound is less than about 0.5 wt %, preferably less than 0.1 wt %.

This polymerisation step is usually done in the pre-polymerisation step prior to the polymerisation process used for producing the polyolefin, especially for producing the nucleated polyolefin.

Prepolymerisation Details:

The preparation of the polyolefin polymers, especially the nucleated propylene polymer comprises in addition to the (main) polymerisation of the propylene polymer prior thereto a pre-polymerisation in a pre-polymerisation reactor (PR) upstream to the first polymerisation reactor (R1).

In the pre-polymerisation reactor (PR) a polypropylene (Pre-PP) is produced. The pre-polymerisation is conducted in the presence of the modified Ziegler-Natta catalyst (ZN-C). According to this embodiment the modified Ziegler-Natta catalyst (ZN-C), the co-catalyst (Co), and the external donor (ED) are all introduced to the pre-polymerisation step. However, this shall not exclude the option that at a later stage for instance further co-catalyst (Co) and/or external donor (ED) is added in the polymerisation process, for instance in the first reactor (R1). In one embodiment the modified Ziegler-Natta catalyst (ZN-C), the co-catalyst (Co), and the external donor (ED) are only added in the pre-polymerisation reactor (PR).

The pre-polymerisation reaction is typically conducted at a temperature of 0 to 60° C., preferably from 15 to 50° C., and more preferably from 20 to 45° C.

The pressure in the pre-polymerisation reactor is not critical but must be sufficiently high to maintain the reaction mixture in liquid phase. Thus, the pressure may be from 20 to 100 bar, for example 30 to 70 bar.

In a preferred embodiment, the pre-polymerisation is conducted as bulk slurry polymerisation in liquid propylene, i.e. the liquid phase mainly comprises propylene, with optionally inert components dissolved therein. Furthermore, according to the present invention, an ethylene feed can be employed during pre-polymerisation as mentioned above.

It is possible to add other components also to the pre-polymerisation stage. Thus, hydrogen may be added into the pre-polymerisation stage to control the molecular weight of the polypropylene (Pre-PP) as is known in the art. Further, antistatic additive may be used to prevent the particles from adhering to each other or to the walls of the reactor.

The precise control of the pre-polymerisation conditions and reaction parameters is within the skill of the art.

Due to the above defined process conditions in the pre-polymerisation, a mixture (MI) of the modified Ziegler-Natta catalyst (ZN-C) and the polypropylene (Pre-PP) produced in the pre-polymerisation reactor (PR) is obtained. Preferably the modified Ziegler-Natta catalyst (ZN-C) is (finely) dispersed in the polypropylene (Pre-PP). In other words, the modified Ziegler-Natta catalyst (ZN-C) particles introduced in the pre-polymerisation reactor (PR) split into smaller fragments which are evenly distributed within the growing polypropylene (Pre-PP). The sizes of the introduced modified Ziegler-Natta catalyst (ZN-C) particles as well as of the obtained fragments are not of essential relevance for the instant invention and within the skilled knowledge.

Accordingly, the propylene polymer is preferably produced in a process comprising the following steps under the conditions set out above In the pre-polymerisation, a mixture (MI) of the modified Ziegler-Natta catalyst (ZN-C) and the polypropylene (Pre-PP) produced in the pre-polymerisation reactor (PR) is obtained.

Preferably the modified Ziegler-Natta catalyst (ZN-C) is (finely) dispersed in the polypropylene (Pre-PP). Subsequent to the pre-polymerisation, the mixture (MI) of the modified Ziegler-Natta catalyst (ZN-C) and the polypropylene (Pre-PP) produced in the pre-polymerisation reactor (PR) is transferred to the first reactor (R1). Typically the total amount of the polypropylene (Pre-PP) in the final propylene copolymer (R-PP) is rather low and typically not more than 5.0 wt.-%, more preferably not more than 4.0 wt.-%, still more preferably in the range of 0.5 to 4.0 wt.-%, like in the range 1.0 of to 3.0 wt.-%.

Polymerisation processes, where the catalyst components of the invention are useful, comprise at least one polymerisation stage, where polymerisation is typically carried out in solution, slurry, bulk or gas phase. Typically, the polymerisation process comprises additional polymerisation stages or reactors.

In one particular embodiment the process contains at least one bulk reactor zone and at least one gas phase reactor zone, each zone comprising at least one reactor and all reactors being arranged in cascade.

In one particularly preferred embodiment the polymerisation process for polymerising olefins, in particular propylene optionally with comonomers, like ethylene or other α-olefins, comprises at least one bulk reactor and at least one gas phase reactor arranged in that order. In some preferred processes the process comprises one bulk reactor and at least two, e.g. two or three gas phase reactors.

The process may further comprise pre- and post-reactors.

Prereactors comprise typically prepolymerisation reactors as already explained above. In these kinds of processes use of higher polymerisation temperature (70° C. or higher, preferably 80° C. or higher, even 85° C. or higher) either in some or all reactors of the reactor cascade, is preferred in order to achieve some specific properties to the polymers. The new inventive method can be easily scaled up in order to avoid common up-scaling problems in the prior art which led to unsatisfied catalyst morphology and particle size distribution as well as reduced activity at higher temperature.

The catalyst component according to the present invention has a high nucleating effect in polypropylene, which is of outmost importance when polypropylenes with improved stiffness-impact behaviour are desired.

Using the above described modified catalyst component for the preparation of nucleated polypropylene thus provides nucleated polypropylene products comprising polymeric nucleating agents like poly vinyl compounds, with improved stiffness-impact balance/behaviour, due to increased crystallinity (i.e. increase of the Crystallisation temperature Tcr) of the produced polypropylene.

There is also an increase seen in the Melting Temperature (Tm) of the nucleated polypropylene produced with this catalyst composition.

In the following the present invention is further illustrated by means of examples Experimental Part Test Methods
A. Measuring Methods
The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative $^{13}C\{^{1}H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2.1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2.1 erythro regio-defects was quantified using the average integral of the two characteristic methyl sites at 17.7 and 17.2 ppm:

$P_{21e}=(I_{e6}+I_{e8})/2$

The amount of 1.2 primary inserted propene was quantified based on the methyl region with correction undertaken for sites included in this region not related to primary insertion and for primary insertion sites excluded from this region:

$P_{12}I_{CH3}+P_{12e}$

The total amount of propene was quantified as the sum of primary inserted propene and all other present regio-defects:

$P_{total}=P_{12}+P_{21e}$

The mole percent of 2.1 erythro regio-defects was quantified with respect to all propene:

$[21e]$ mol.-%=100*$(P_{21e}/P_{total})$

MFR$_2$ (230° C.) is measured according to ISO 1133 (230° C., 2.16 kg load)

The xylene soluble fraction at room temperature (XS, wt.-%): The amount of the polymer soluble in xylene is determined at 25° C. according to ISO 16152; 5$^{th}$ edition; 2005-07-01.

DSC analysis, melting temperature ($T_m$) and heat of fusion ($H_f$), crystallization temperature ($T_c$) and heat of crystallization ($H_c$): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and heat of fusion ($H_f$) are determined from the second heating step.

ICP Analysis (Al, Mg, Ti)

The elemental analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was further diluted with DI water up to the final volume, V, and left to stabilize for two hours.

The analysis was run at room temperature using a Thermo Elemental iCAP 6300 Inductively Coupled Plasma—Optical Emmision Spectrometer (ICP-OES) which was calibrated using a blank (a solution of 5% $HNO_3$), and standards of 0.5 ppm, 1 ppm, 10 ppm, 50 ppm, 100 ppm and 300 ppm of Al, Mg and Ti in solutions of 5% $HNO_3$.

Immediately before analysis the calibration is 'resloped' using the blank and 100 ppm standard, a quality control sample (20 ppm Al, Mg and Ti in a solution of 5% $HNO_3$ in DI water) is run to confirm the reslope. The QC sample is also run after every $5^{th}$ sample and at the end of a scheduled analysis set.

The content of Mg was monitored using the 285.213 nm line and the content for Ti using 336.121 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

The amount of residual VCH in the catalyst/oil mixture was analysed by gas chromatography. Toluene was used as internal standard.

Chemicals Used in the Examples:
2-ethyl-hexanol—CAS no 104-76-7
propylene glycol butyl mono ether—CAS no 5131-66-8, provided by Sigma-Aldrich
bis(2-ethylhexyl) citraconate—CAS no 1354569-12-2
Necadd 447—provided by M-I SWACO
Viscoplex 1-254—provided by RohMax Additives GmbH
diethyl aluminum chloride—CAS no 96-10-6, provided by Witco

EXAMPLES

Example 1

1a) Catalyst Preparation 3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to storage vessel.

21.2 g of Mg alkoxide prepared above was mixed with 4.0 ml bis(2-ethylhexyl) citraconate for 5 min. After mixing the obtained Mg complex was used immediately in the preparation of catalyst component.

19.5 ml titanium tetrachloride was placed in a 300 ml reactor equipped with a mechanical stirrer at 25° C. Mixing speed was adjusted to 170 rpm. 26.0 of Mg-complex prepared above was added within 30 minutes keeping the temperature at 25° C. 3.0 ml of Viscoplex 1-254 and 1.0 ml of a toluene solution with 2 mg Necadd 447 was added. Then 24.0 ml of heptane was added to form an emulsion. Mixing was continued for 30 minutes at 25° C. Then the reactor temperature was raised to 90° C. within 30 minutes. The reaction mixture was stirred for further 30 minutes at 90° C. Afterwards stirring was stopped and the reaction mixture was allowed to settle for 15 minutes at 90° C.

The solid material was washed 5 times: Washings were made at 80° C. under stirring 30 min with 170 rpm. After stirring was stopped the reaction mixture was allowed to settle for 20-30 minutes and followed by siphoning.

Wash 1: Washing was made with a mixture of 100 ml of toluene and 1 ml donor
Wash 2: Washing was made with a mixture of 30 ml of TiCl4 and 1 ml of donor.
Wash 3: Washing was made with 100 ml toluene.
Wash 4: Washing was made with 60 ml of heptane.
Wash 5. Washing was made with 60 ml of heptane under 10 minutes stirring.

Afterwards stirring was stopped and the reaction mixture was allowed to settle for 10 minutes decreasing the temperature to 70° C. with subsequent siphoning, and followed by $N_2$ sparging for 20 minutes to yield an air sensitive powder.

1b) VCH modification of the catalyst

~35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared in 1a (Ti content 1.4 wt %) was added and after additionally 20 minutes 5.0 g of vinylcyclohexane (VCH) was added.). The temperature was increased to 60° C. during 30 minutes and was kept there for 20 hours. Finally, the temperature was decreased to 20° C. and the concentration of unreacted VCH in the oil/catalyst mixture was analysed and was found to be 120 ppm weight.

1c) Polymerisation—Inventive Example 1

41 mg of donor D (TEAL/Donor ratio 10 mol/mol) and 206 mg of TEAL (TEAL/Ti ratio 250 mol/mol) was mixed with 30 ml of pentane. Donor to titanium was 25 mol/mol. Half of this mixture was added to the 5 litre stirred reactor and half was added to 209 mg of the oil/catalyst mixture (=124.7 mg of dry catalyst). After 10 minutes the pentane/catalyst/TEAL/donor D mixture was added to the reactor, followed by 300 mmol H2 and 1.4 kg of propylene at room temperature. The temperature was increased to 80° C. during 16 minutes and was kept at this temperature for 1 hour. Unreacted propylene was flashed out by opening the exhaust valve. The reactor was opened and the polymer powder was collected and weighed.

MFR, isotacticity, crystallisation properties and stiffness of the polymer is shown in table 2.

Comparative Example 1

In this example the same catalyst as in example 1 was used, but the catalyst was used as such without VCH modification of the catalyst. 43 mg of catalyst was used and the hydrogen amount was 170 mmol, but otherwise the polymerisation conditions were the same as in example 1.

From table 2 it is seen that the VCH modified catalyst (Inv.Ex. 1) has about 10° C. higher crystallisation temperature than the catalyst without VCH modification (Comparative example Comp.Ex 1)

Comparative Example 2

C2a) Comparative Catalyst Preparation

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390.

C2b) VCH Modification of the Catalyst

This example was done in accordance with Example 1b, but as catalyst was used a phthalate containing catalyst prepared according to example C2a, Ti content 1.8 wt %. 52 ml of oil, 1.17 g TEAL, 0.73 g donor D were used. The reaction temperature was 65° C. with this catalyst. The concentration of unreacted VCH in the final catalyst was 200 ppm weight. The concentration of unreacted VCH is almost twice as high with this phthalate containing catalyst, despite the higher reaction temperature, as with the phthalate free catalyst described in example 1b.

C2c) Polymerisation

Polymerisation was done in accordance to example 1, but using the catalyst prepared in this comparative example. 22 mg of donor D, 176 mg of TEAL and 84.4 mg of the oil/catalyst mixture was used, giving a donor to titanium ratio of 25 mol/mol. 620 mmol of hydrogen was used.

In Table 1 the VHC conversion of Inventive Ex. 1 and Comparative Ex. 2 are compared. In Table 2 the catalysts of Inventive Ex. 1 and Comparative Ex. 1 and the produced polymers are compared.

TABLE 1

| VCH conversion | | Inv. Ex. 1 | Comp. Ex. 2 |
|---|---|---|---|
| Residual VCH | [ppm] | 120 | 200 |
| Activity | [kgPP/gcath] | 31 | 69 |
| MFR | [g/10 min] | 16 | 20 |

TABLE 2

| Polymer properties | | Inv. Ex. 1 | Comp. Ex 1 |
|---|---|---|---|
| Activity | [kgPP/gcath] | 31 | 18 |
| MFR | [g/10 min] | 16 | 7.5 |
| mmmm | [%] | 97.5 | 97.8 |

TABLE 2-continued

| Polymer properties | | Inv. Ex. 1 | Comp. Ex 1 |
|---|---|---|---|
| Tc | [° C.] | 128.2 | 117.4 |
| Tm | [° C.] | 167.3 | 164.5 |
| Crystallinity | [%] | 52.2 | 51.9 |
| Flexural modulus | [Mpa] | 1990 | 1680 |

From table 1 it can be seen that the in reactor nucleated phthalate free catalyst used in example 1 gives very high conversion rate, especially seen in the lower amount of residual VCH.

From Table 2 it can be seen that the activity of the phthalate free catalyst significantly improves by about 70% due to the presence of the nucleating agent.

The invention claimed is:

1. Process for the production of a nucleated polypropylene composition, comprising:
    A) obtaining a catalyst composition containing a catalyst component through the steps of:
        a1) providing a solution of at least a Group 2 metal alkoxy compound (Ax) being the reaction product of a Group 2 metal compound (MC) and a monohydric alcohol (A) comprising in addition to the hydroxyl moiety at least one ether moiety optionally in an organic liquid reaction medium; or
        a2) providing a solution of at least a Group 2 metal alkoxy compound (Ax') being the reaction product of a Group 2 metal compound (MC) and an alcohol mixture of the monohydric alcohol (A) and a monohydric alcohol (B) of formula ROH, optionally in an organic liquid reaction medium; or
        a3) providing a solution of a mixture of the Group 2 metal alkoxy compound (Ax) and a Group 2 metal alkoxy compound (Bx) being the reaction product of a Group 2 metal compound (MC) and the monohydric alcohol (B), optionally in an organic liquid reaction medium; or
        a4) providing a solution of Group 2 metal alkoxy compound of formula $M(OR1)_n(OR2)_m X_{2-n-m}$ or mixture of Group 2 alkoxides $M(OR1)_n X_{2-n'}$ and $M(OR2)_m X_{2-m'}$, where M is Group 2 metal, X is halogen, R1 and R2 are different alkyl groups of C2 to C16 carbon atoms, and 0≤n<2, 0≤m<2 and n+m+(2−n−m)=2, provided that both n and m≠0, 0<n'≤2 and 0<m'≤2; and
    b) adding said solution from step a1, a2, a3, or a4 to at least one compound (TC) of a transition metal of Group 4 to 6, and
    c) obtaining the solid catalyst component particles,
    d) washing said solidified particles,
    e) recovering the solidified particles of the olefin polymerisation catalyst component,
    wherein an electron donor is added at any step prior to step c) and is a non-phthalic internal electron donor,
    wherein the catalyst component is washed in step d) at least three times with at least one toluene and at least one $TiCl_4$ washing step and 1 to 3 further washing steps with an aromatic and/or aliphatic hydrocarbon selected from toluene heptane, or pentane;
    wherein internal donor is added to either the toluene washing step and/or the $TiCl_4$ washing step in an amount of 10 to 60 wt % of the total amount of donor used in catalyst preparation steps a) to d);

wherein the catalyst component is further modified by a polymeric nucleating agent comprising vinyl compound units, and wherein the catalyst modification is performed until the concentration of unreacted vinyl compound is less than 0.1 wt %; and B) polymerizing propylene, optionally with co-monomers selected from C2 or C4 to C12 monomers in the presence of the catalyst composition obtained from step A), wherein the nucleated polypropylene composition comprises a polymeric nucleating agent in an amount in the range from 15 to 500 ppm.

2. The process according to claim 1, wherein the polymeric nucleating agent is selected from the group of vinyl alkanes or vinyl cycloalkanes, 3-methyl-1-butene, 3-ethyl-1-hexene, 3-methyl-1-pentene, 4-methyl-1-pentene or mixtures thereof.

3. The process according to claim 1, wherein the internal donor (ID) used in the preparation of the catalyst component is selected from (di)esters of non-phthalic carboxylic (di) acids, 1,3-diethers, derivatives and mixtures thereof.

4. The process according to claim 3, wherein the electron donor for the catalyst component is selected from diesters of mono-unsaturated dicarboxylic acids, belonging to the group comprising malonates, maleates, succinates, citraconates, glutarates, cyclohexene-1,2-dicarboxylates and benzoates, and any derivatives and/or mixtures thereof.

5. The process according to claim 1, wherein the catalyst composition comprises the modified catalyst component together with a co-catalyst and an external donor for the polymerization of propylene, optionally with co-monomers selected from C2 or C4 to C12 monomers.

* * * * *